June 23, 1953  D. H. MALLINSON  2,642,721
CLOSED CYCLE ELASTIC FLUID COMPRESSOR-TURBINE
PLANT AND CONTROL THEREOF
Filed Jan. 25, 1949
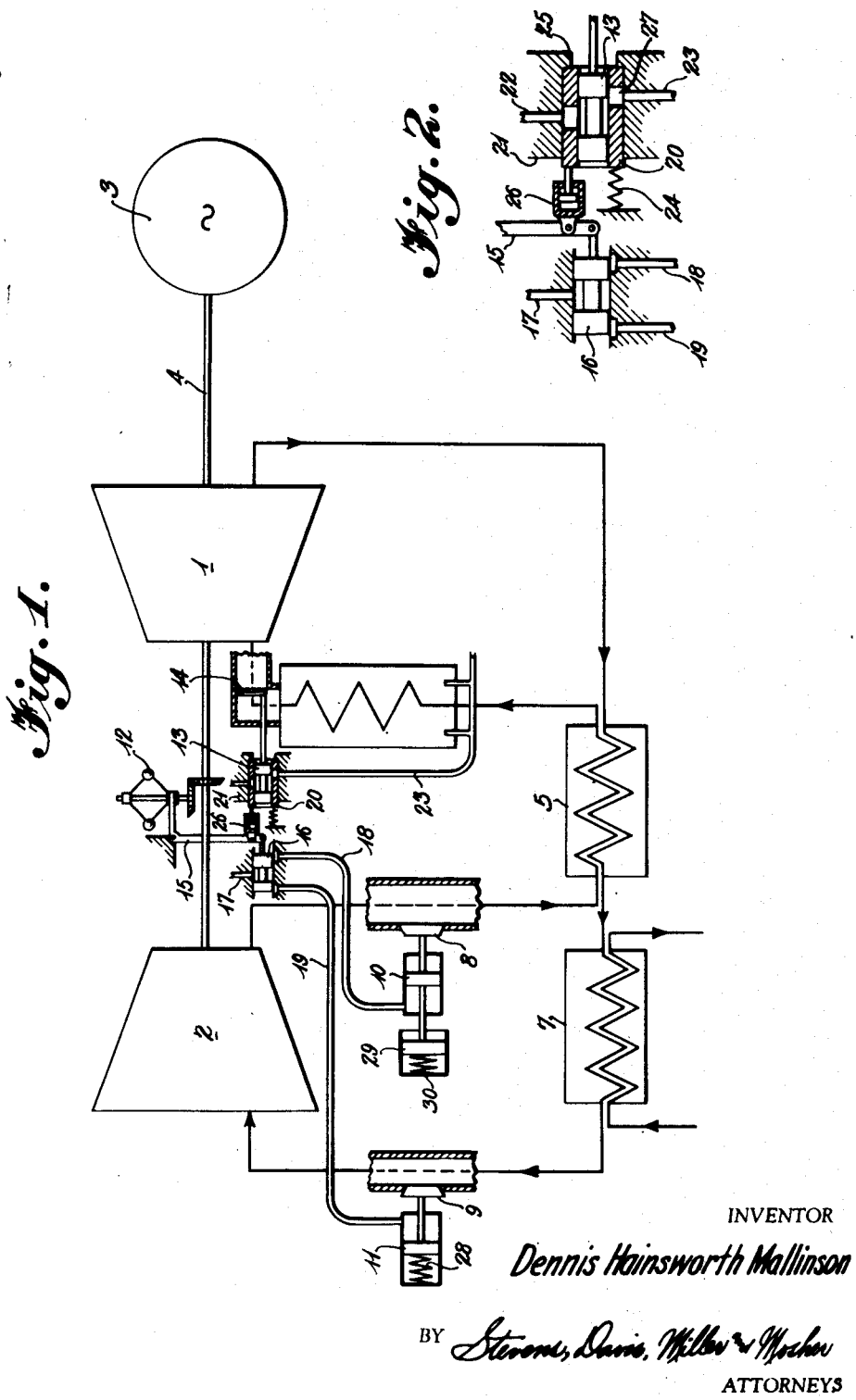
INVENTOR
Dennis Hainsworth Mallinson
BY Stevens, Davis, Miller & Mosher
ATTORNEYS Patented June 23, 1953

2,642,721

UNITED STATES PATENT OFFICE 2,642,721

CLOSED CYCLE ELASTIC FLUID COMPRESSOR-TURBINE PLANT AND CONTROL THEREOF

Dennis Hainsworth Mallinson, Fleet, England, assignor to Power Jets (Research and Development) Limited, London, England, a British company Application January 25, 1949, Serial No. 72,564
In Great Britain January 29, 1948

4 Claims. (Cl. 60—59)

This invention is for improvements in or relating to closed cycle elastic fluid compressor-turbine plants and control thereof.

It is well known that the main thermodynamic advantage of a closed cycle elastic fluid compressor-turbine plant compared with one operating on an open cycle is that with the former the compressor pressure ratio and turbine inlet temperature may be maintained constant at part load, thus ensuring good component efficiencies and virtually constant overall efficiency throughout a wide load range.

Control of the power output of a closed cycle elastic fluid compressor-turbine plant may be effected by varying the pressure level of the working fluid in the closed circuit of the plant to change the mass of fluid flowing therein. This is normally done by discharging some of the fluid into or withdrawing fluid from one or more reservoirs in which compressed fluid may be stored by the compressor-turbine plant until required.

The present invention proposes a closed cycle elastic fluid compressor-turbine plant whose power output is varied by varying the pressure level of the working fluid in the closed circuit of the plant, characterised in that, in order to effect an increase in the power output, fluid is transferred into the closed circuit directly from the atmosphere, the pressure level of the working fluid in the closed circuit at any power output below the maximum being such that the minimum pressure is sub-atmospheric; thus air may be inspired at a low pressure stage of the cycle, the atmosphere being utilised as an equivalent of the storage reservoir in a conventional plant.

As an additional feature the invention further proposes that the pressure level of the working fluid in the closed circuit of the plant be such that at any power output above a prescribed minimum, the maximum pressure is above atmospheric, so permitting the transfer of air from the closed circuit at a high pressure stage of the cycle by exhausting to the atmosphere, and thereby reducing the power output of the plant.

Conveniently, the plant may be so designed that the working fluid in the closed circuit at the maximum power output has a minimum pressure equal to atmospheric pressure and at the prescribed minimum power output has a maximum pressure equal to atmospheric pressure.

Accordingly the invention provides a closed cycle elastic working fluid compressor-turbine plant in which air is the elastic working fluid, wherein a controllable outlet is provided downstream of a compression stage of the cycle to allow discharge of some of the compressed working air from the closed circuit in order to reduce both the mass flow and the pressure level of the working fluid and thereby to reduce the turbine power output, and a controllable inlet is provided upstream of said compression stage to allow admission of air to increase both the mass flow and the pressure level of the working fluid in the closed circuit and thereby to increase the turbine power output.

Assuming that in the interests of power production and also in order to maintain a constant compressor pressure ratio, the turbine is required to run at constant speed, then the outlet and inlet valves may be controlled by a speed governor arranged so that when a decrease of load tends to increase the turbine speed from a predetermined value the outlet valve is opened to lower the power output of the plant, and when an increase of load tends to decrease the turbine speed from the predetermined value the inlet valve is opened to increase the power output of the plant, so tending to maintain the predetermined turbine speed.

A difficulty that arises in the application of the invention is that of taking up increasing load, since air can only be admitted from the atmosphere into the low pressure side of a compression stage and must pass through the compression stage before reaching the turbine, and in consequence acts at first as a brake.

According to a feature of the invention, therefore, supplementary means are provided for temporarily meeting an increased load demand, otherwise than by mass flow variation, these means being linked with the control through variation of mass flow so as to be operative only while the air flow is being adjusted. Such means may embody provision temporarily to increase the heat supply to the working air for the turbine in order to raise the turbine entry temperature when the inlet valve is opened to admit air to increase the mass flow and pressure level and so raise the power output of the compressor-turbine plant. Thus, the supply of heat to the working air may be controlled by a thermostat sensitive to turbine inlet temperature and tending to maintain said temperature constant, and a speed governor may over-ride the thermostatic control of the turbine entry temperature to allow overheating of the working air, thus raising the temperature to enable the turbine to overcome the temporary braking effect of the compressor, when air is being admitted.

One form of the invention will now be described by way of example with reference to the accompanying drawing.

In the drawing:

Figure 1 represents a schematic arrangement of a gas turbine power plant with control mechanism.

Figure 2 represents some details of the control mechanism of Figure 1 to an enlarged scale.

The plant shown comprises an elastic fluid turbine 1 in which air is the working fluid and which drives its air compressor 2 and an electric generator 3. For convenience and simplicity these three components are arranged axially in relation to one another with their shafts 4 directly coupled. The working air passes through a repeated cycle of operations consisting of compression in the compressor 2, heating first in a heat exchanger 5 and finally in an air heater 6, expansion in the turbine 1, cooling first in the heat exchanger 5 and finally in an air cooler 7.

An air outlet valve 8 is arranged in the working air circuit after the compressor and an air inlet valve 9 is arranged in the working air circuit before the compressor and in the interests of economic power production and in order to keep the pressure ratio of the compressor constant these valves are actuated in dependence upon a turbine driven constant speed governor 12 so that the speed of the turbine is maintained constant at widely varying loads.

Also, in order to maintain the turbine inlet temperature constant the supply of heat to the air heater (regulated by a fuel supply piston valve 13) is controlled by a bi-metallic strip thermostat 14 arranged in the working air inlet to the turbine.

When the plant operates to produce its maximum power output the minimum pressure of the working air is atmospheric and the compressor delivery pressure and air mass in the plant flow are at their maximum values. In order to reduce the power output of the plant the outlet valve 8 is opened and the air escapes to the atmosphere, the compressor delivery pressure is reduced and the minimum pressure of the working air becomes sub-atmospheric, the inlet valve 9 being held shut. Conversely, to increase the power output the outlet valve 8, is held shut and the inlet valve 9 is opened, allowing more air to enter the cycle and so raising the pressure level of the working air. To this end the governor 12 actuates a cranked lever 15 which is connected to a servo-piston 16 so that this piston moves to the right or the left according as the turbine speed increases or decreases so as to admit pressurized fluid supplied through the inlet 17, to the pressure side of either piston 10 or piston 11 respectively by way of either pipe 18 or pipe 19. In consequence, when a decrease in load tends to cause an increase in turbine speed the outlet valve 8 is opened and air escapes until the power output of the turbine is lowered to the decreased load. Similarly a decrease in turbine speed due to an increase in the load causes the inlet valve 9 to be opened and air admitted to the circuit. In either case when the speed is restored to its predetermined value, the servo-piston 16 resumes a neutral position such that the pistons 10 and 11 are both relieved of pressure. In the case when the load is increased, as air admitted to the circuit must pass through the compressor before affecting the turbine, the load on the turbine will be further increased. A temporary method of increasing the turbine power output whilst air is being admitted is therefore required. In the present case this is arranged for by enabling the constant speed governor 12 to over-ride the thermostatic control of turbine inlet temperature and to overheat the air in the air heater, thus raising temperature of the air at the turbine. Thus the cylinder 20 containing the fuel supply piston valve 13 is itself arranged to slide in a housing 21 which receives and discharges liquid fuel by way of pipes 22 and 23 respectively. This cylinder 20 is constrained to the right by a compression spring 24 against a shoulder 25 in the housing 21, and is attached to the governor actuated cranked lever 15 by means of a link 26 which is telescopic under compressive loads. Under normal operating conditions with the rotational speed of the turbine substantially constant the cylinder 20 is against the shoulder 25 and the fuel supply is varied only by movement of the piston valve 13 over the outlet port 27 in the cylinder 20. With a fall in speed, the cranked lever 15 pulls the cylinder 20 by means of the link 26 to the left and consequently the amount by which the outlet port 27 is covered by the piston valve 13 is reduced and an increased fuel supply ensues. The turbine power output is increased and will then cater for both the increased electrical load and the additional mass flow through the compressor. The condition of increased fuel supply persists, despite the effect of the consequently increased turbine inlet temperature on the thermostat controlled valve 13, until the turbine speed is restored to the predetermined value when the cylinder 20 is reseated by the spring 24 against the shoulder 25. In the event of a reduction in speed below the predetermined value the cranked lever 15 moves to the right without any movement of the cylinder 20 since the link 26 collapses in compression.

The valves 8 and 9 both tend to be held in place during normal steady running by the air pressure differences, and the external force of the servo system need only be applied to open and close the valves during load changes. The loading on the valves may, however, be varied in order to give similar response at all loads. This is done in the case illustrated by applying to each valve a load which while nearly balancing it, leaves a slight bias tending to close it. Thus, in the case of the inlet valve 9, a spring 28 is arranged to exert a suitable force against the back of piston 11 slightly above that obtaining at the valve 9; in the case of the outlet valve 8, a balancing piston 29 of similar area to the valve is urged by a spring 30 at a pressure slightly below that obtaining in the region of the valve.

The percentage of full load to which a plant of the type described could maintain constant overall efficiency or thereabouts would depend entirely on the pressure ratio of the cycle. The maximum pressure cannot fall below atmospheric since no air can then be discharged; similarly the minimum pressure cannot rise above atmospheric pressure since no air can then be inspired. Thus, if the pressure ratio of the cycle were 8:1 then the pressure level could be reduced until the maximum pressure decreased from 8 atmospheres to 1 atmosphere and the minimum pressure fell from 1 atmosphere to ⅛ atmosphere. The mass flow being proportional to the pressure and the specific output remaining constant, the output could be ⅛ of the full design output. Below this value determined by the pressure ratio, reduction in output would have to be obtained by other means such as the reduction of turbine inlet temperature.

Compared with an open cycle turbine the proposed type of closed circuit turbine has the advantage of good part load efficiencies to much lower partial loads than are possible to attain in an open cycle turbine. Compared with the conventional closed cycle turbine, the proposed turbine has the known advantage of constant part-load efficiency associated with the closed cycle turbine but in a lower design load range than can be provided for by conventional closed cycle turbines. Air reservoirs are eliminated by the use of the atmosphere as both a "source" and a "sink."

I claim:

1. A power plant comprising an air compressor, an air heater, an air turbine for delivering the useful power output of the plant, a closed circuit connecting said compressor, heater and turbine having a high pressure portion between the compressor outlet and heater inlet and the heater outlet and turbine inlet and a low pressure portion between the turbine outlet and compressor inlet, an air outlet valve in said high pressure portion and an air inlet valve in said low pressure portion each communicating directly with the atmosphere, and means controlling said valves in response to changes in the load on the plant so that on increase in load said inlet valve only is opened, said high pressure portion of the closed circuit remaining closed, while on decrease in load said outlet valve only is opened, said low pressure portion of the closed circuit remaining closed.

2. A power plant according to claim 1, further comprising governor means responsive to variations from a predetermined rotational speed of said turbine, said valve controlling means being operative upon response of said governor means to open said inlet valve when the turbine speed falls below said predetermined speed and to open said outlet valve when the turbine speed rises above said predetermined value.

3. A power plant according to claim 2, said air heater having control means operative upon response of said governor means to increase the heat input of said air heater simultaneously with opening of said inlet valve.

4. A power plant according to claim 1, further comprising a thermostat responsive to departures of the temperature of air entering said turbine from a predetermined value, a first air heater control means operative upon such response of said thermostat to modify the heat input of said heater so tending to restore to temperature of air entering said turbine to the predetermined value, governor means responsive to variations from a predetermined rotation speed of said turbine, said valve controlling means being operative upon response of said governor means to open said inlet valve when the turbine speed falls below said predetermined speed and to open said inlet valve when the turbine speed rises above said predetermined value, and a second air heater control means operative in accordance with the response of said governor means to increase the effectiveness of said air heater simultaneously with opening of said inlet valve, said second air heater control means while operative overriding said first air heater control means.

DENNIS HAINSWORTH MALLINSON.

References Cited in the file of this patent

UNITED STATES PATENTS

| Number | Name | Date |
| --- | --- | --- |
| 1,809,409 | Granger | June 9, 1931 |
| 2,172,910 | Keller | Sept. 12, 1939 |
| 2,203,731 | Keller | June 11, 1940 |
| 2,268,074 | Keller | Dec. 30, 1941 |
| 2,298,625 | Larrecq | Oct. 13, 1942 |
| 2,319,995 | Keller | May 25, 1943 |
| 2,454,358 | Traupel | Nov. 23, 1948 |